United States Patent [19]

Ito

[11] 4,449,499

[45] May 22, 1984

[54] FUEL INJECTION SYSTEM

[75] Inventor: Shoji Ito, Aichi, Japan

[73] Assignee: Aisan Kogyo Kabushiki Kaisha, Obu, Japan

[21] Appl. No.: 450,226

[22] Filed: Dec. 16, 1982

[30] Foreign Application Priority Data

Jan. 21, 1982 [JP] Japan .............................. 57-7881[U]

[51] Int. Cl.³ ..................... F02D 11/10; F02D 1/04; F02M 1/12; F02M 3/00
[52] U.S. Cl. ................................. 123/339; 123/376; 123/361
[58] Field of Search ....... 123/339, 376, 361, DIG. 11, 123/340, 378, 389, 401; 180/108, 105 E, 106, 107

[56] References Cited

U.S. PATENT DOCUMENTS

| 3,338,111 | 8/1967 | Walker | 123/339 |
| 3,489,127 | 1/1970 | Higashigawa | 123/339 |
| 3,760,785 | 9/1973 | Harrison et al. | 123/339 |
| 4,143,634 | 3/1979 | Ritter et al. | 123/339 |
| 4,181,107 | 1/1980 | Nomura et al. | 123/339 |
| 4,200,596 | 4/1980 | Iiyama et al. | 123/339 |
| 4,363,303 | 12/1982 | Takayama | 123/339 |
| 4,391,245 | 7/1983 | Larson | 123/339 |

Primary Examiner—Raymond A. Nelli
Attorney, Agent, or Firm—Dennison, Meserole, Pollack & Scheiner

[57] ABSTRACT

A fuel injection system comprises a thermo-sensitive element adapted to expand and contract in response to the engine temperature, a cam adapted to rotate in response to expansion and contraction of the thermo-sensitive element, a lever rotatably supported by a throttle shaft and carrying an idle switch thereon. The idle switch is maintained at on-condition through angular moment of the throttle shaft in its closed direction when an acceleration pedal is released. The lever is rotated in association with the rotation of the cam with the opening degree of the throttle valve at idling operation being controlled by the lever so as to adjust the opening degree of the throttle valve at idling operation to suit with the engine temperature.

3 Claims, 3 Drawing Figures

FUEL INJECTION SYSTEM

BACKGROUND OF THE INVENTION

This invention relates to a fuel injection system for supplying fuel to an internal combustion engine of an automobile, and more particularly to a fuel injection system having a fuel cut mechanism for stopping fuel injection from an injector at idle operation in response to engine temperature and engine speed.

In a conventional fuel cut mechanism, an idle switch for detecting idling condition is fixed to the body of a fuel injection system and is adapted to detect only a fully closed position of the throttle valve after warm-up operation of the engine. In other words, it cannot detect the idling condition except the fully closed position of the throttle valve, that is, the fast idle condition wherein the throttle valve is slightly opened during periods from cold engine starting to engine warm-up completion. Accordingly, in order to detect such a fast idle condition, it is necessary to provide another sensor, thus rendering the structure and the control of the mechanism to be complicated.

SUMMARY OF THE INVENTION

Accordingly, it is an object of the present invention to provide a fuel injection system having a fuel cut mechanism which may continuously and readily detect the fast idle condition during periods from cold engine starting to engine warm-up completion as well as the idling condition after engine warm-up.

According to the present invention, in combination with a fuel injection system having a fuel cut mechanism for detecting an idling condition of an engine by an idle switch and for stopping fuel supply at the idling condition in response to the engine condition such as engine temperature and engine speed, the fuel injection system comprises a body thereof, a thermo-sensitive element fixed outside of the body and adapted to expand and contract in response to the engine temperature, a cam provided outside of the body and adapted to rotate in response to expansion and contraction of the thermo-sensitive element, an air intake passage provided inside of the body, a throttle valve provided inside of the air intake passage and rotatably fixed to a throttle shaft, a lever rotatably supported by the throttle shaft and carrying the idle switch thereon. The idle switch is maintained at oncondition through angular moment of the throttle shaft in its closed direction when an acceleration pedal is released. The lever is rotated in association with the rotation of the cam with the opening degree of the throttle valve at idling operation being controlled by the lever so as to adjust the opening degree of the throttle valve at idling operation to suit with the engine temperature. With this arrangement, the positioning of the idle switch relative to the throttle valve at idle operation is maintained constant at all times during periods from cold engine starting to engine warm-up, and the detection of the idle condition may be continuously carried out only by the idle switch without requiring any other supplementary sensors, thus simplifying the structure and the control of the fuel injection system. Further, since the fast idle condition may be also detected and fuel supply may be stopped before engine warm-up operation is completed, optimum fuel economy may be achieved. Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
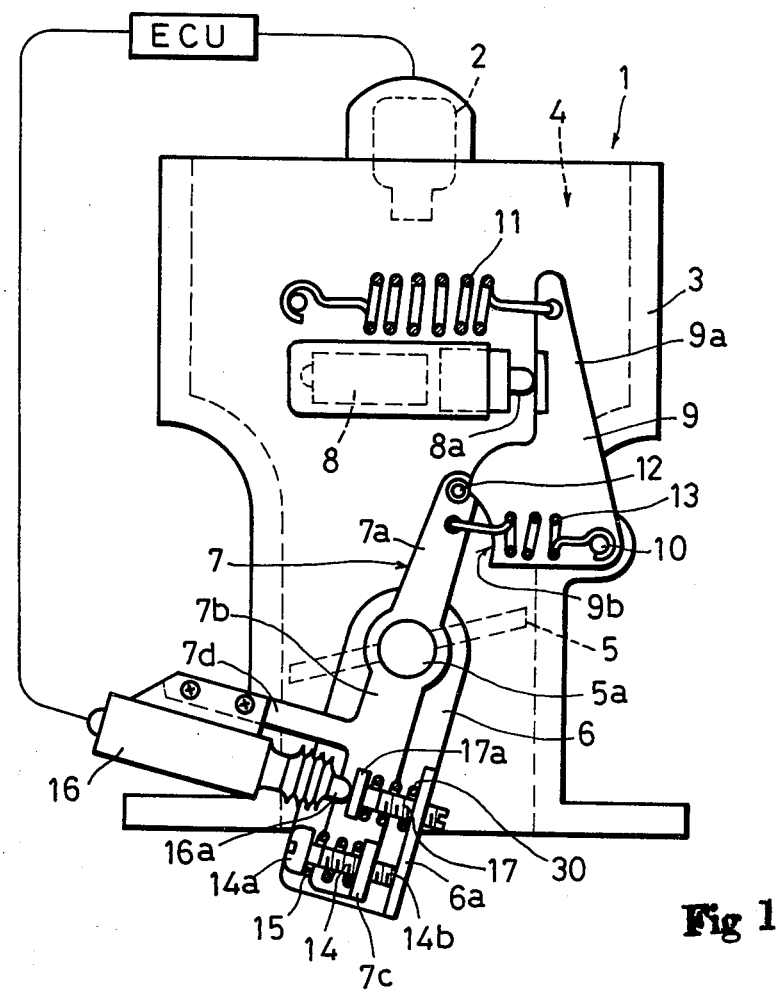
FIG. 1 shows a vertical cross-sectional view of the fuel injection system according to the first preferred embodiment.

Referring now to FIG. 1 which shows a first preferred embodiment of the invention, reference numeral 1 generally designates a fuel injection system, in which an injector 2 is connected with an electronically controlled unit ECU. The injector 2 is adapted to inject fuel to an air intake passage 4 provided in a body 3, in response to the command from the ECU. Reference numeral 5 designates a throttle valve provided in the air intake passage 4 and carried by a throttle shaft 5a. The throttle valve 5 is shown as being in the fast idle position. An arm 6 is fixed to the throttle shaft 5a and a lever 7 is rotatably supported by the throttle shaft 5a outside of the body 3. Reference numeral 8 designates a thermo-sensitive element such as wax, a part of which is immersed in the engine coolant. The axis 8a of the thermo-sensitive element 8 is adapted to expand and contract in response to change in temperature of the engine coolant. Reference numeral 9 designates a cam rotatably supported by a pin 10 provided on the body 3. The arm portion 9a of the cam 9 is attracted in the counterclockwise direction by a spring 11 arranged in parallel relation with the thermo-sensitive element 8, so as to abut against the axis 8a of the thermo-sensitive element 8 and rotate in response to the expansion and the contraction of the axis 8a.

The upper arm portion 7a of the lever 7 is provided with a rotating member 12 at its upper end. The rotating member 12 abuts against a substantially circular arcuate curved surface 9b formed on a part of the cam 9 by a spring 13 interposed between the upper portion of the upper arm portion 7a and the pin 10.

The lower arm portion 7b of the lever 7 is provided with a bent portion 7c through which a stopper screw 14 is threadedly engaged. The stopper screw 14 is effective to retain a bent portion 6a provided at the lower portion of the arm 6. A spring 15 is interposed between the head portion 14a of the stopper screw 14 and the bent portion 7c.

The lower arm portion 7b is provided with a branched portion 7d extending therefrom at substantially right angles. An idle switch 16 connected to the ECU is fixed to the idle switch 16. An adjusting screw 17 is threadedly engaged through the bent portion 6a of the arm 6. The head portion 17a of the adjusting screw 17 is adapted to abut against the contact point 16a of the idle switch 16. A spring 30 is interposed between the head portion 17a and the bent portion 6a of the arm 6. In the fast idle position of the throttle valve 5 as shown in FIG. 1 or under the released position of an accelerator pedal (not shown), a clockwise angular moment is applied to the throttle shaft 5a by a throttle spring (not shown). As the result, the contact point 16a of the idle switch 16 is in contact with the head portion 17a of the adjusting screw 17, and the pointed end 14b of the stopper screw 14 is in contact with the bent portion 6a of the arm 6.

In operation, when the throttle valve 5 is in the fast idle position, the axis 8a of the thermo-sensitive element 8 is contracted and the rotating member 12 of the lever 7 is brought into contact with the upper portion of the curved surface 9b. In such a position where the contact point 16a of the idle switch 16 is in contact with the head portion 17a of the adjusting screw 17, the throttle valve 5 is slightly opened. When the engine is gradually brought to its warm-up condition and the axis 8a of the thermo-sensitive element 8 is expanded, the cam 9 is rotated in the clockwise direction as shown in FIG. 1 and the rotating member 12 is downwardly moved along the curved surface 9b, thus allowing the lever 7 to be rotated in the clockwise direction as shown in FIG. 1. Because of this rotation of the lever 7, the opening degree of the throttle valve 5 is gradually decreased. When the engine warm-up is completed, the throttle valve 5 is substantially closed and thereafter it is adjusted in response to the engine temperature. In this operation, since the arrangement of the lever 7 relative to the arm 6 is maintained constant at all times, the contact point 16a of the idle switch 16 is kept in contact with the head portion 17a of the adjusting screw 17 at all times. Accordingly, the idling condition of the engine is continuously detected irrespective of the cold engine or warm-up condition.

Figure 2:
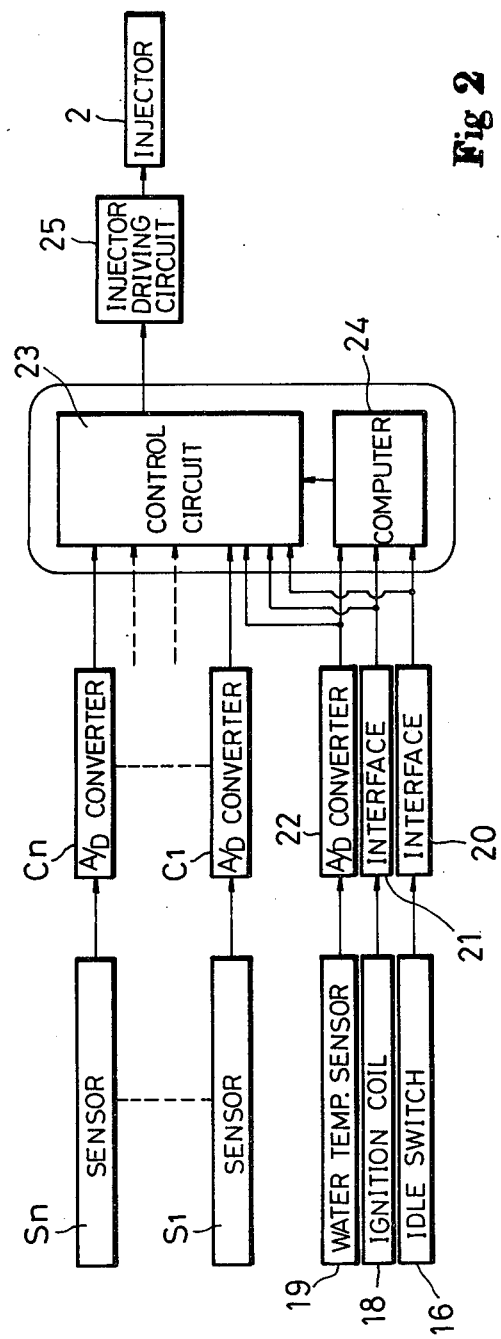
FIG. 2 shows a block diagram of the electronically controlled circuit incorporated in the fuel injection system of FIG. 1.

Referring next to FIG. 2 which illustrates the operation of the ECU for feeding a fuel cut command signal to the injector 2 in response to the detection signals fed from the idle switch 16.

The detection signals fed from the idle switch 16, the ignition coil 18 and the thermo sensor 19 for detecting the temperature of the engine coolant are inputted through the interfaces 20 and 21, and the A/D converter 22, respectively to the control circuit 23 and the computer 24. Another detection signals for detecting the engine condition other than the above are fed from a plurality of sensors $S_1$ through $S_n$ and inputted through the corresponding A/D converters $C_1$ through $C_n$ to the control circuit 23. The control circuit 23 determines fuel supply corresponding to the engine condition, in response to these detection signals, and feeds fuel injecting command signals through an injector driving circuit 25 to the injector 2. When the idle swtich 16 is on, in other words, when the engine is under the idling condition and the engine speed exceeds the predetermined value and the temperature of the engine coolant exceeds the predetermined value, the computer 24 feeds a fuel cut command signal to the control circuit 23 in response to the detection signals supplied from the idle switch 16, the ignition coil 18 and the thermo sensor 19. The control circuit 23 stops fuel injection from the injector 2 in response to the fuel cut command signal.

Figure 3:
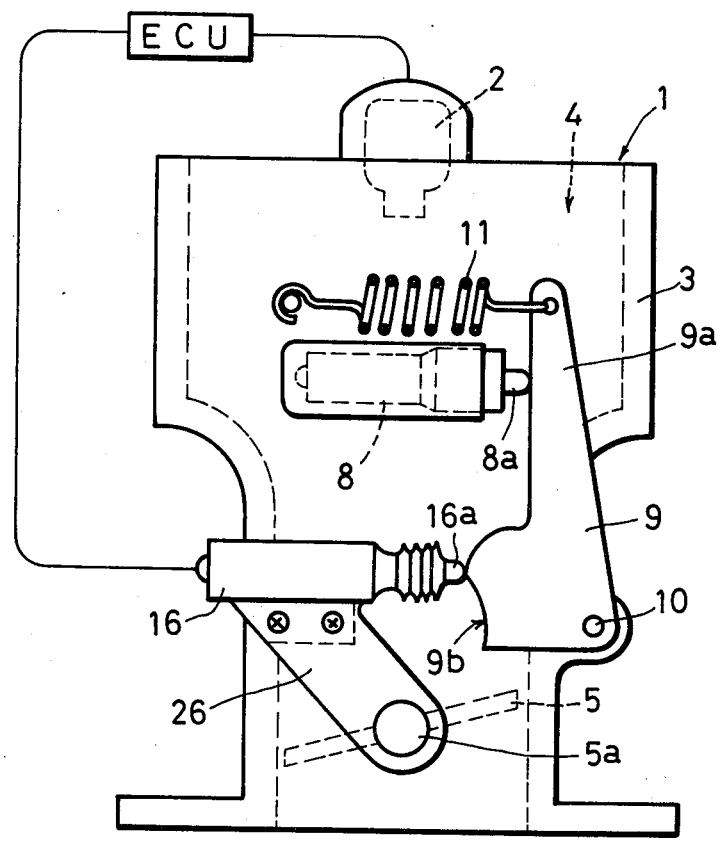
FIG. 3 shows a vertical cross-sectional view of the fuel injection system according to the second preferred embodiment.

Referring next to FIG. 3 illustrating a second preferred embodiment of the invention, wherein like numerals denote like elements as shown in FIG. 1. The cam 9 is adapted to rotate about the pin 10 in association with the expansion and contraction of the axis 8a of the thermo-sensitive element 8. A lever 26 is fixed to the throttle shaft 5a carrying the throttle valve 5 thereon. An idle switch 16 is fixed to the end of the lever 26 and is adapted to rotate simultaneously with the throttle shaft 5a. A clockwise angular moment is imparted to the lever 26 by a throttle spring (not shown) of the throttle shaft 5a. As a result, in a fast idle position of the throttle valve, the contact point 16a of the idle switch 16 is in contact with the upper end of the curved surface 9b of the cam 9. The axis 8a of the thermo-sensitive element 8 is in the contracted position as shown in FIG. 3 and as the engine operation is transferred from cold starting to warm-up completion, the axis 8a is gradually expanded, thereby rotating the cam 9 in the clockwise direction as shown in FIG. 3. Accordingly, the contact point 16a of the idle switch 16 is gradually moved downwardly along the curved surface 9b and as the result, the throttle valve 5 gradually closes the air intake passage 4 to establish the normal idle position. In this embodiment, the contact point 16a of the idle switch 16 serves to detect the idle position of the throttle valve 5 and to control the opening degree of the throttle valve 5 at idle operation, thus permitting successive detection of the engine idle condition during engine operation from cold starting to warm-up completion and allowing the structure of the system to be simplified.

Having thus described the preferred embodiment of the invention it should be understood that numerous structural modifications and adaptations may be restored to without departing from the spirit of the invention.

What is claimed is:

1. In combination with a fuel injection system having a fuel cut mechanism for detecting an idling condition of an engine by an idle switch and for stopping fuel supply at the idling condition in response to the engine condition such as engine temperature and engine speed, the improvement comprising a body thereof, a thermo-sensitive element fixed outside of said body and adapted to expand and contract in response to the engine temperature, a cam provided outside of said body and adapted to rotate in response to expansion and contraction of said thermo-sensitive element, an air intake passage provided inside of said body, a throttle valve provided inside of said air intake passage and rotatably fixed to said throttle shaft, a lever rotatably supported by said throttle shaft and carrying an idle switch thereon, said idle switch being maintained at on-condition through angular moment of said throttle shaft in its closed direction when an acceleration pedal is released, said lever being rotated in association with the rotation of said cam with the opening degree of said throttle valve at idling operation being controlled by said lever so as to adjust the opening degree of said throttle valve at idling operation to suit with the engine temperature.

2. The fuel injection system as defined in claim 1 wherein said system comprises a rotating member provided at the upper end of said lever and adapted to rotate in contact with the curved surface of said cam in association with the rotation of said cam, a first bent member provided at the lower end of said lever and arranged at substantially right angles to said lever, a stopper screw threadedly engaged with said first bent member, an arm fixed to said throttle shaft at the exterior of said body, a second bent member provided at the lower end of said arm and arranged at substantially right angles to said arm, an adjusting screw threadedly engaged with said second bent member and adapted to come into contact with the pointed end of said idle switch; the pointed end of said stopper screw being abutted against said second bent member.

3. The fuel injection system as defined in claim 1 wherein said idle switch is fixed to one end of said lever and adapted to rotate in contact with the curved surface of said cam in association with the rotation of said cam.

* * * * *